United States Patent [19]

Million et al.

[11] Patent Number: 4,517,434
[45] Date of Patent: May 14, 1985

[54] METHOD AND APPARATUS FOR MANUFACTURING A TUBE BEND METAL

[75] Inventors: Karl Million; Horst Zimmermann, both of Oberhausen, Fed. Rep. of Germany

[73] Assignee: M.A.N. Maschinenfabrik Augsburg-Nürnberg Aktiengesellschaft, Fed. Rep. of Germany

[21] Appl. No.: 557,928

[22] Filed: Dec. 5, 1983

[30] Foreign Application Priority Data

Dec. 8, 1982 [DE] Fed. Rep. of Germany ....... 3245401

[51] Int. Cl.³ .................... B23K 31/06; B23K 9/04
[52] U.S. Cl. ................. 219/76.12; 219/76.11; 219/76.1
[58] Field of Search ............ 219/76.1, 76.11, 76.12, 219/76.14, 73.11, 73.21, 136, 125.1

[56] References Cited

U.S. PATENT DOCUMENTS

| 2,963,570 | 12/1960 | Rieppel | 219/74 |
| 4,146,162 | 3/1929 | Skakunov | 219/125.1 X |
| 4,224,360 | 9/1980 | Ohnishi et al. | 219/76.12 |
| 4,253,006 | 2/1981 | Ludwig | 219/76.1 |

FOREIGN PATENT DOCUMENTS 2400910 7/1974 Fed. Rep. of Germany .
2629571 1/1978 Fed. Rep. of Germany .
7608782 12/1977 Netherlands ...................... 219/76.1

Primary Examiner—Roy N. Envall, Jr.
Assistant Examiner—C. M. Sigda
Attorney, Agent, or Firm—McGlew and Tuttle

[57] ABSTRACT

A method of manufacturing a tube bend of a metal comprises positioning a base ring in the range of the welding device, using the welding device to deposit a first section of metal on the ring, moving the ring and the welding device through an arc relatively to each other by substantially the thickness of the first section of metal and thereafter depositing a subsequent section over the first section and repeating the moving and the depositing until the desired section thickness is formed into a wall. The device includes means for mounting a plate for pivotal movement and a base ring mounted on the plate for movement therewith below a welding device arranged so that the welding device and the plate remove relatively through an arcuate path so that a series of sections of metal may be built up into a tube bend wall. The welding device advantageously includes an electrode feeder and the apparatus preferably includes a welding device to provide a plating along the side of the wall section which is built up.

9 Claims, 2 Drawing Figures 4,517,434

METHOD AND APPARATUS FOR MANUFACTURING A TUBE BEND METAL

FIELD AND BACKGROUND OF THE INVENTION

This invention relates in general to welding methods and devices and in particular to a new and useful method of welding a tube bend in which a tube bend wall is built of a plurality of sections and to an apparatus for effecting the welding method.

Deposit welding or built-up welding has been employed at a growing rate for manufacturing large and high quality workpieces, particularly for parts of nuclear reactors. For example, the German OS No. 26 29 571 discloses a method of manufacturing semi-donut shaped shells which are made up of sections of equal bent angles which are welded to a bend by means of longitudinal seams extending in the plane of the bend. Even though the welded semi-donut shells have advantages over cast or forged ones in their structural condition, strength properties, and manufacturing costs, the longitudinal seams needed in the manufacturing process are to be considered disadvantageous. Another disadvantage of this prior art method is that only one welding head can be employed, so that no simultaneous inside plating of the wall of the bend, which is frequently necessary, is possible. It is further known in built-up welding, to employ welding heads which are rotatable about the vertical axis (German AS No. 24 00 916).

SUMMARY OF THE INVENTION

The invention is directed to a method permitting the manufacture of bends in one piece and with an inside plating. The invention is further directed to a device for carrying out this method.

The manufacture of a tube bend is carried out by depositing welding in one piece so that a wall of the bend of the tube is built up of a plurality of sections which are produced starting from a base ring by means of circularly travelling welding heads. Upon finishing the deposit welding of one section which also advantageously includes an inside plating, the basic ring which is mounted on a pivoting mechanism over a pivotal plate, is pivoted downwardly through an angle corresponding to the produced section. The following section is then deposited in a seamless continuation of the first section.

An apparatus for carrying out the welding comprises a mounting stand in which a plate is pivotally mounted with a base ring provided on the plate below a welding apparatus in an arrangement in which the welding apparatus and the plate are movable relatively toward and away from each other and through an arc.

With the plurality of sequentially welded sections of the bend, the transition zone from one section to the following one exhibit a satisfactory inside surface quality by compensating the difference in height of the bend sections by depositing additional weld heads in the individual welding zones or by program-controlled varying of the layer thickness during the rotary motion of the welding heads it is possible to compensate for the difference in height of a section of the bend, resulting from the acute angle of the section relative to the pivotal axis. In accordance therewith, the height of the section may be continuously increased over the semicircle at either side, either by means of additional weld heads deposited over portions of the ring surface, or by continually increasing the fusion plate which may be controlled by continuously varying the welding speed or the amperage. Upon finishing the outer wall of one bend section, which may be made up of a ferritic material, the inside plating is deposited by means of another welding head. The inside plating is advantageously made up of two overlapping weld beads of an austenitic material. To build up the following sections of the bend, the base ring which extends horizontally in its initial position and is secured to a pivotal plate and now supports the already finished section, is pivoted by a pivoting mechanism downardly through an angle corresponding to one section of bend. The welding plane thereagain coincides with the horizontal plane passing through the pivotal axis. Advantageously, the pivoting of the pivotal plate in accordance with the progressing build-up of the wall of the bend is program controlled.

To obtain a completely satisfactory internal structure of the wall at an optimum welding speed, it is known to cool the welding zone. It is advisable to use carbon dioxide for this cooling of the deposited material in that this has the advantage that hydrogen which might be present in the weld material is reduced. A particularly intense cooling can be obtained by using a carbon dioxide in a solid state. If the weld material is cooled immediately after the deposit by using a welding powder to which carbon dioxide in a solid state is admixed, advantageous physical or metallurgical effects can be obtained.

The inventive method is carried out with a device which is a combination of a welding equipment with a pivoting mechanism and a control unit. The welding equipment substantially comprises welding heads which are equipped with electrode holders with electrode feeders and are mounted on projecting arms for displacement and for rotary motion about a vertical axis. The welding equipment further includes coolant supply means. The pivoting mechanism comprises a drive unit with an end support, the pivotal plate, and a base ring supported thereon. The control unit is to control the rotary speed of the welding heads, the deposit of the weld material, and the pivotal motion. Advantageously, a numerical control is provided.

A tube bend manufactured in accordance with the inventive method has the advantage that the internal structure of the produced wall is homogeneous, since no longitudinal seams are necessary, and that the corrosion resistant inside plating can be applied during the manufacturing operation.

Accordingly it is an object of the invention to provide an improved method of welding in which the wall of a bend is formed by moving a welding apparatus relative to the base ring which is to carry the weld relatively away from each other through an arc so as to build up individual sections on the base ring to form a wall of the plurality of sections.

A further object of the invention is to provide an apparatus for effecting the welding of a tube bend which includes a support for a base ring and which is mounted in association with a welding apparatus so that they may be moved relatively and wherein the welding apparatus may be actuated to apply an initial section on the base ring and thereafter the welding apparatus and the support are moved relatively and a new weld section is applied over the first and so on.

A further object of the invention is to provide a apparatus for effecting the formation of a tube bend of a metal material which is simple in design, rugged in construction and economical to manufacture.

The various features of novelty which characterize the invention are pointed out with particularity in the claims annexed to and forming a part of this disclosure. For a better understanding of the invention, its operating advangages and specific objects attained by its uses, reference is made to the accompanying drawings and descriptive matter in which preferred embodiments of the invention are illustrated.

GENERAL DESCRIPTION OF PREFERRED EMBODIMENTS

Figure 1:
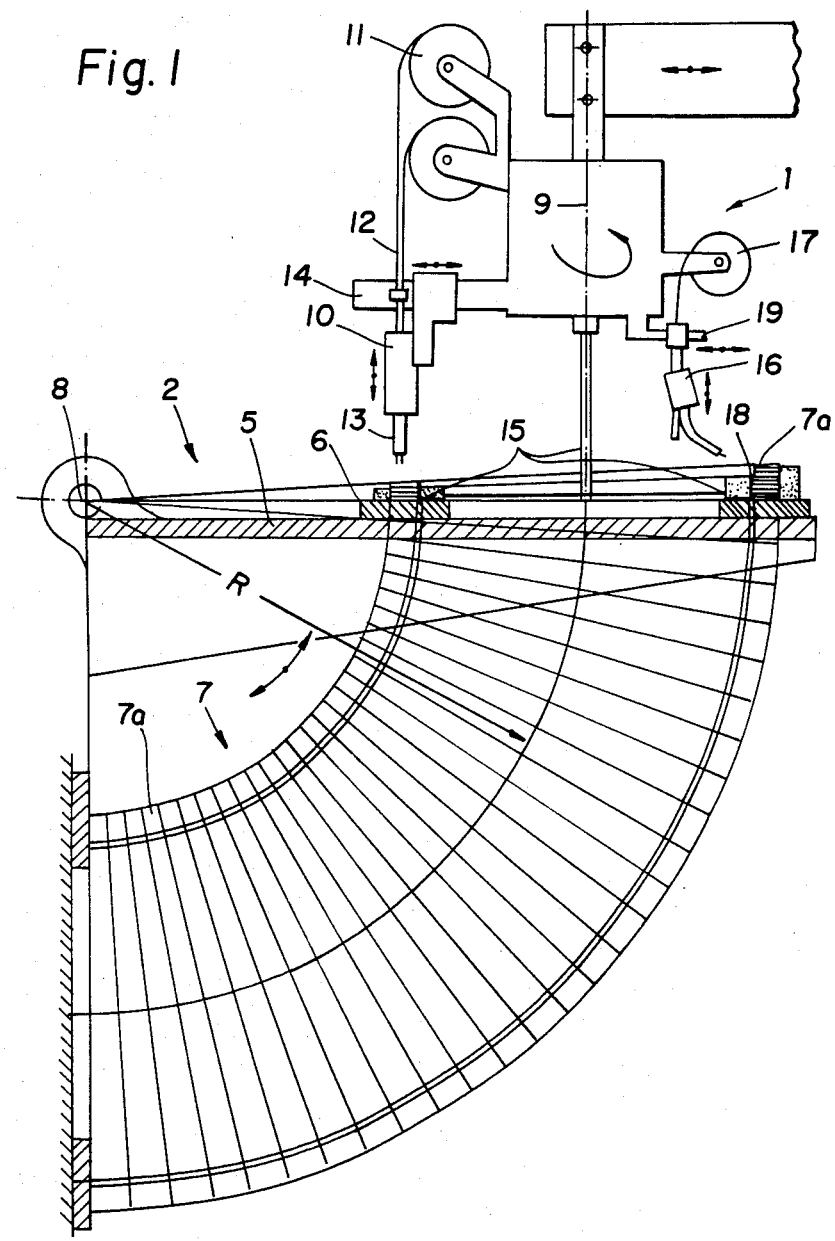
FIG. 1 is a transverse sectional view of the welding equipment, including a pivoting mechanism and the outlines of a bend.
Figure 2:
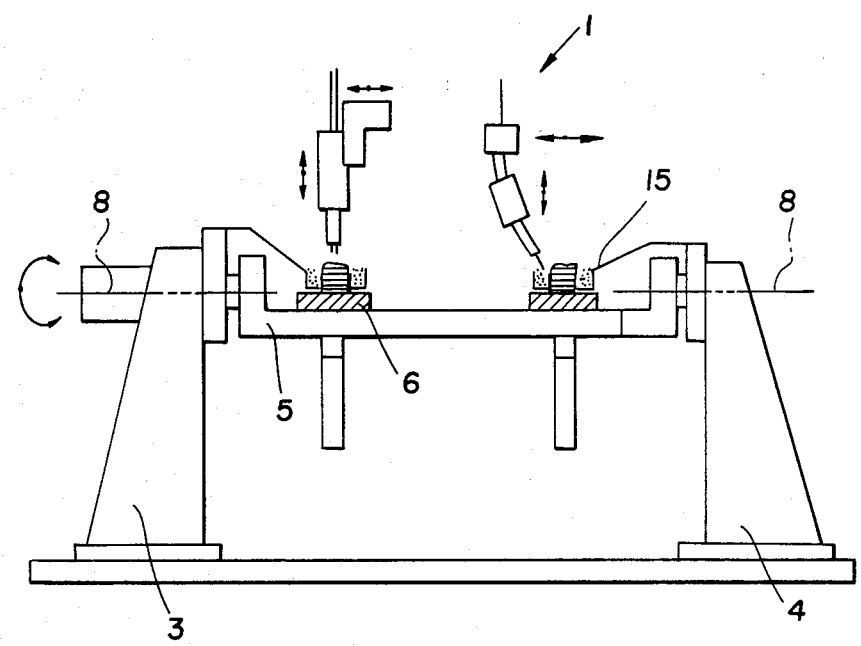
FIG. 2 is an elevation of the pivoting mechanism.

Referring to the drawings in particular the invention embodied therein comprises a method of manufacturing a tube bend which comprises positioning a base ring 6 in the range of a welding device generally designated 1. In accordance with the invention the base ring 6 is fixed to a plate 5 which is mounted on a pivot axis 8 for pivotal movement through an arc. In the embodiment of the invention shown the plate 5 is pivoted and the welding apparatus 1 is positioned over the base ring 6 in a position where the weld may be built up on a space rim in a plurality of sections. A first ring section of metal is first applied over the ring 6 and thereafter the welding apparatus 1 and the plate 5 are moved relatively away from each other by an amount of the thickness of the section and a new right section is added and the process is repeated until a complete wall is formed of a plurality of these sections which are deposited.

The device comprises vertically disposed welding equipment generally designated 1 adjustable to the position of the workpiece, a pivoting mechanism 2, and a control unit (not shown). Pivoting mechanism 2 includes a drive unit 3 with an end support 4, pivotal plate 5, and base ring 6. The head 7 is built up on the base ring 6 which extends horizontally in its basic position and is placed on pivotal plate 5 so as to have its center spaced from the pivotal axis 8 of the drive unit 3 by a radius R of the bend.

The welding equipment 1 is disposed above this ring 6 so as to have its vertical axis 9 spaced from the pivotal axis 8 by the distance R. The wall of bend 7 is built up successively of a plurality of ring sections 7a. Every such section 7a is produced by a first welding head 10 which, along with its electrode feeder 11, travels in rotary motion of vertical axis 9. In welding head 10, electrodes 12 are supported by means of electrode holders 13. Welding head 10 is movably mounted on the radial arm 14. While building up the wall, welding head 10 is displaced radially after each complete circle of travel by approximately the thickness of a bead. Any wall thickness of bend 7 can thus be produced.

After depositing a complete layer, pivotal plate 5 is pivoted by a layer thickness downwardly. The difference in height of each section 7a of the bend between the locations of minimum and maximum spacing from the pivotal axis 8 is compensated by additional deposits of weld material 7a.

For submerged arc welding, a powder holding structure 15 is provided at the circumference of the bend section, which is not lowered with pivotal plate 5 as the buildup continues.

After the wall of ring section 7a has reached a certain height, i.e. at the latest, when the section has been completed, a plating 18, which may be of an austenitic material, is deposited on the inside of the bend section, by means of a second welding head 16 which is supplied electrodes through an electrode feeder 17. Welding head 16 is mounted for axial and radial displacement on a radial arm 19. A multilayer plating may thus be deposited sequentially from below upwardly.

Upon finishing the deposit welding of bend section 7a, the pivotal plate is pivoted about axis 8 downwardly, through an angle corresponding to section the thickness of 7a, so that now the upper plane of the welded section extends in the horizontal plane passing through the pivotal axis 8. The following bend section may then be welded. If a quarter band is manufactured, the down pivoting is repeated until base ring 6 carrying the band extends vertically below pivotal axis 8.

To augment the amount of deposited welding material per ring section, the vertically disposed welding equipment 1 may be provided on its circumference with a plurality of welding heads 10 and coolant supply means may be associated with each of the welding zones.

While specific embodiments of the invention have been shown and described in detail to illustrate the application of the principles of the invention, it will be understood that the invention may be embodied otherwise without departing from such principles.

What is claimed is:

1. A method of manufacturing a tube bend having a radius of curvature and using welding equipment having at least one welding head and a base ring movable with respect to the welding head, comprising the steps of:

positioning the base ring in a horizontal plane below the welding head;

depositing a first ring section of metal using the welding head on the ring;

rotating the base ring about a horizontal axis and along the radius of curvature by substantially a thickness of the first ring ring section;

depositing a subsequent ring section using the welding head over the first ring section; and repeating the moving and the depositing steps until the desired number of ring sections are formed for the tube bend.

2. A method according to claim 1, including rotating the at least one welding head about a substantially vertical axis for depositing each ring section and varying the thickness of each ring section around each ring section.

3. A method according to claim 2, including varying the thickness around each ring section by depositing additional beads of weld at selected locations only partly around each ring section.

4. A method according to claim 1, including varying the thickness of each ring section by depositing additional metal around only a portion of each ring section.

5. A method according to claim 2, wherein the ring sections are made up of ferritic material and including plating an austenitic material on at least one side of the sections which are being formed.

6. A method according to claim 2, including applying carbon dioxide to the sections as they are formed by the welding head for cooling them.

7. A method according to claim 6, wherein carbon dioxide in a solid state is used as a coolant.

8. A method according to claim 7, including mixing the carbon dioxide in the solid state with welding powder before applying the carbon dioxide in the solid state to the sections.

9. A device for forming a welded tube bend, comprising a pivotal support plate, means mounting said support plate for pivotal movement through an arc, a base ring positioned on said support plate, a first welding device positioned over said base ring and positioned to form a first weld section of a selected thickness over said base ring, means for moving said support plate with said base ring away from said first welding device so as to position said first welding device in a position for applying a subsequent weld section of a selected thickness over the first weld section, an additional welding device for applying a weld portion on a side of each weld section, said additional welding device being movable toward and away from said support plate and alterally in respect to said support plate, drive means connected to said plate for pivoting said plate, and means connected to said first welding device to move said first welding device during the formation of seach weld section.

* * * * *